United States Patent Office 2,871,211
Patented Jan. 27, 1959

2,871,211

RUBBER VULCANIZATION USING PENTAALKYL-SUBSTITUTED TETRAHYDROPYRIMIDINES AS ACCELERATORS

Thomas F. Mika, Orinda, Calif., assignor to Shell Development Company, Emeryville, Calif., a corporation of Delaware No Drawing. Application October 12, 1953
Serial No. 385,709

10 Claims. (Cl. 260—23.7)

This invention relates to the vulcanization of rubber. More particularly, the invention relates to an improved process for vulcanizing a rubber in the presence of sulfur using a special class of compounds which function as a vulcanization accelerator and/or as an activator for known vulcanization accelerators, and to the vulcanized rubber products so produced.

Specifically, the invention provides a new and improved method for vulcanizing rubbers, and particularly synthetic rubbers containing butadiene copolymers, which comprises heating the rubber and sulfur in the presence of a special class of compounds consisting of hydrocarbyl-substituted tetrahydropyrimidines and certain salts thereof. The invention further provides improved vulcanized rubber products produced by the above-described process.

As a special embodiment, the invention provides certain novel carboxylic acid salts of the pentaalkyl-substituted 2,3,4,5-tetrahydro-pyrimidines, and particularly the tall oil and rosin salts, which are outstanding as vulcanization activators for oil-extended GR–S rubber stocks.

Natural and synthetic rubbers are vulcanized or cured by heating the rubbers in the presence of sulfur and compounds, such as certain thiuram and thiazole derivatives, which accelerate the vulcanization. In many cases, the initial rate of cure with these accelerators is not very fast and it is generally advisable to add compounds known as activators to increase the initial rate of cure. The activators now available, however, are not too satisfactory for this purpose for, while they accelerate the initial cure, they are "scorchy," i. e., they cause premature curing during processing and storage. In addition, the use of these activators generally results in products which cause premature degeneration of the cured rubbers on prolonged overcuring or on oven aging.

It is an object of the invention, therefore, to provide a new method for curing rubber. It is an object of the invention to provide a method for vulcanizing rubber that gives a fast initial rate of cure. It is a further object to provide vulcanization accelerators or activators which give rapid initial rates of cure without exhibiting undesirable scorchy properties. It is a further object to provide a method for vulcanizing rubbers which gives products having improved physical properties which are retained on prolonged exposure to overcure or oven aging. It is a further object to provide a new class of salts of pentaalkyl-substituted tetrahydropyrimidines which are particularly useful and valuable as vulcanization accelerators and activators for oil-extended GR–S rubber stocks. Other objects and advantages of the invention will be apparent from the following detailed description thereof.

It has now been discovered that these and other objects may be accomplished by using as the vulcanization accelerators or activators members of the special class of compounds consisting of hydrocarbyl-substituted tetrahydropyrimidines and organic acid salts thereof. These compounds may be used by themselves as vulcanization accelerators or they may be, and preferably are as indicated hereinafter, utilized as activators for known vulcanization accelerators. When these compounds are added to rubber stocks even in very small amounts, they bring about a very rapid initial rate of cure. Surprisingly, this improvement in activity is obtained without suffering any decrease in scorch resistance as the unvulcanized compositions containing these compounds may be stored and processed for a considerable period of time without danger of premature vulcanization taking place. Further advantage is found in the fact that the vulcanized products prepared with these compounds have very good physical properties, such as high tensile strength, resilience and low set, and surprisingly retain these properties even after prolonged overcure or oven aging.

The compounds used as accelerators or accelerator activators according to the present invention comprise the hydrocarbyl-substituted tetrahydropyrimidines and their carboxylic acid salts. The expression tetrahydropyrimidine includes those pyrimidines having a double bond between a ring nitrogen atom and a ring carbon atom, such as the 3,4,5,6-tetrahydropyrimidines, the 1,2,5,6-tetrahydropyrimidines and the 2,3,4,5-tetrahydropyrimidines. The expression "hydrocarbyl" as used in relation to the substituent attached to the tetrahydropyrimidine radical refers to monovalent hydrocarbon radicals, such as aliphatic, cycloaliphatic or aromatic hydrocarbon radicals. The carboxylic acid salts of hydrocarbyl-substituted tetrahydropyrimidines are those obtained by reacting tetrahydropyrimidines with carboxylic acids, and preferably the unsubstituted aliphatic monocarboxylic acids. Examples of the hydrocarbyl-substituted tetrahydropyrimidines include, among others, 2,2,4,4,6-pentamethyl-2,3,4,5-tetrahydropyrimidine, 2,4 - dimethyl - 2,4,6 - tripropyl - 2,3,4,5-tetrahydropyrimidine, 2,4-diethyl-5,5-dimethyl-2,3,4,5 - tetrahydropyrimidine, 2,4 - dimethyl - 2,4,6 - tributyl - 2,3,4,5 - tetrahydropyrimidine, 2,4 - dioctyl - 2,4,6 - trihexyl - 2,3,4,5 - tetrahydropyrimidine, 2 - methyl - 4 - ethyl - 3,4,5,6 - tetrahydropyrimidine, 2,4,6 - trimethyl - 3,4,5,6 - tetrahydropyrimidine, 2 - butyl - 4,6 - tripropyl - 3,4,5,6 - tetrahydropyrimidine, 2 - dodecyl - 4 - hexyl - 3,4,5,6 - tetrahydropyrimidine, 2 - cyclohexyl - 4 - hexyl - 3,4,5,6 - tetrahydropyrimidine, 2 - phenyl - 4 - hexyl - 3,4,5,6 - tetrahydropyrimidine, 2 - heptadecyl - 4 - hexyl - 3,4,5,6 - tetrahydropyrimidine, and 2-isooctyl-4-hexyl-3,4,5,6-tetrahydropyrimidine.

Examples of the salts of the above described hydrocarbyl-substituted tetrahydropyrimidines include, among others, 2,2,4,4,6-pentamethyl-2,3,4,5-tetrahydropyrimidine oleate, 2,2,4,4,6-pentamethyl-2,3,4,5-tetrahydropyrimidine napthenate, 2,2,4,4,6 - pentamethyl - 2,3,4,5 - tetrahydropyrimidine abietate, the salt of hydrogenated rosin and 2,2,4,4,6 - pentamethyl - 2,3,4,5 - tetrahydropyrimidine, the salt of tall oil fatty acids and 2,2,4,4,6-pentamethyl-2,3,4,5-tetrahydropyrimidine, the salt of polymerized rosin and 2,2,4,4,6-pentamethyl-2,3,4,5-tetrahydropyrimidine, 2,4 - dimethyl - 2,4,6 - tripropyl - 2,3,4,5 - tetrahydropyrimidine oleate, 2,4-dibutyl-2,4,6-trioctyl-2,3,4,5-tetrahydropyrimidine stearate, 2,4 - dioctyl - 2,4,6 - trihexyl - 2,3,4,5 - tetrahydropyrimidine laurate, 2,4,6 - trioctyl - 3,4,5,6-tetrahydropyrimidine oleate, 2-butyl-4,6-tripropyl, 3,4,5,6-tetrahydropyrimidine dodecenoate, 2-dodecyl-4-hexyl-3,4,5,6-tetrahydropyrimidine oleate, the tall oil fatty acid salt of 2-phenyl-4-hexyl-3,4,5,6-tetrahydropyrimidine, and the rosin salt of 2-isooctyl-4-hexyl-3,4,5,6-tetrahydropyrimidine.

The particularly preferred compounds to be used as accelerators or accelerator activators according to the process of the invention are the polyalkylated 2,3,4,5-tetrahydropyrimidines wherein each of the alkyl groups contains no more than 12 carbon atoms, and preferably those having at least 5 separate alkyl groups attached to at least 3 different ring carbon atoms, and the salts of these tetrahydropyrimidines and monocarboxylic acids, and particularly the higher fatty acids and rosin acids, such as 2,4-dibutyl-2,4,6-tributyl-2,3,4,5-tetrahydropyrimidine, 2,2,4,4,6-pentamethyl-2,3,4,5-tetrahydropyrimidines, 2,4 - dimethyl - 2,4,6 - triisopropyl - 2,3,4,5 - tetrahydropyrimidine, 2,4-dimethyl-2,4,6-trioctyl-2,3,4,5-tetrahydropyrimidine, 2,4-diisobutyl-2,4,6-tridodecyl-2,3,4,5-tetrahydropyrimidine, 2,4-dimethyl-2,4,6-triisopropyl-2,3,4,5-tetrahydropyrimidine oleate, 2,4-dibutyl-2,4,6-tridecyl-2,3,4,5-tetrahydropyrimidine stearate, the tall oil fatty acid salt of 2,2,3,4,6-pentamethyl-2,3,4,5-tetrahydropyrimidine, the rosin acid salt of 2,4-dibutyl-2,4,6-triheptyl-2,3,4,5-tetrahydropyrimidine, the hydrogenated rosin acid salt of 2,4-dioctyl-2,4,6-trimethyl-2,3,4,5-tetrahydropyrimidine and the polymerized rosin acid salt of 2,4-dibutyl-2,4,6-triisoheptyl-2,3,4,5-tetrahydropyrimidine.

The generic expression "rosin acids" as used herein refers to all those acids ordinarily employed in the preparation of ester gums, such as gum or wood rosin, pine oleo-rosin, pimaric acids, abietic acid, as well as polymerized rosin, disproportionated rosin and hydrogenated rosin.

The 2,2,4,4,6-pentaalkyl-2,3,4,5-tetrahydropyrimidines wherein each alkyl group contains no more than 6 carbon atoms, and their monocarboxylic acid salts, and particularly their salts of tall oil fatty acids and rosin acids come under special consideration, particularly because of their exceptionally fine activity with the hereinafter described oil-extended GR–S rubber stocks.

The above-described preferred polyalkylated 2,3,4,5-tetrahydropyrimidines may be prepared by reacting a ketone such as acetone with anhydrous ammonia at a suitable elevated temperature and in the presence of an acidic condensation catalyst. The ketones which may be employed as reactants in this reaction include the monocarbonylic compounds wherein the carbonylic carbon atom and an adjacent (alpha) carbon atom bearing at least one hydrogen atom are members of an open-chain of carbon atoms. Such ketones may be represented by the general structural formula $RCOCH(R_1)R_2$ wherein R represents a monovalent hydrocarbon radical and $R_1$ and $R_2$, which may be the same or different, are selected from the group consisting of hydrogen and monovalent hydrocarbon radicals. The ketone and ammonia are preferably reacted in stoichiometric proportions, i. e., about .66 mole of ammonia for every mole of ketone, but the reaction goes forward in an efficient manner even though one or the other of the reactants is used in excess, such as acetic acid, oxalic acid, hydrochloric acid, nitric acid, sulfuric acid, hydrobromic acid, phosphoric acid, zinc chloride, ferric chloride, calcium chloride, etc. The amount of the catalyst used may be varied depending on a number of factors including the time and temperature of reaction as well as the nature of the particular ketone reactant and catalyst selected. However, good results have been obtained through the use of from .0001 to .01 mole of catalyst per mole of ketone. Temperatures used in the process generally vary from about 20° C. to 150° C. Superatmospheric pressures are utilized to effect solution of the ammonia in the liquid ketone. In the operation of the process, it is preferred to add the anhydrous ammonia to a solvent solution (e. g., hexane, dioxane, etc.) containing the ketone and dissolved catalyst, heat the mixture for ½ to 5 hours, and then distill the mixture to remove the desired tetrahydropyrimidine.

The carboxylic acid salts of the hydrocarbyl-substituted tetrahydropyrimidines may be prepared by merely reacting the free hydrocarbyl-substituted tetrahydropyrimidine with the carboxylic acid. The tetrahydropyrimidine and acid are preferably reacted in equimolecular quantities, but in some cases, it may be desirable to employ an excess of either reactant. The reaction may generally be effected by merely mixing the reactants in the cold, or by dissolving both reactants in a mutual solvent-like acetone. In some cases, it may be desirable to employ temperatures of the order of about 40° C. to 70° C. to speed the reaction. The crystalline salts which form may then be recovered by any suitable method, such as evaporization, fractional precipitation, and the like.

The above-described compounds may be used in the vulcanization of any rubber susceptible of vulcanization with sulfur, such as natural rubber and synthetic rubbers prepared from butadiene and chloroprene. If they are used with synthetic rubbers, the rubbers may be prepared by any of the known high or low temperature methods using aqueous emulsion or suspension systems, or other known polymerization methods.

The compounds are preferably adapted for use, however, with the synthetic butadiene rubbers. The expression "butadiene rubber" as used herein refers to those polymers having rubber-like properties which are prepared by the polymerization of butadiene with one or more other copolymerizable vinyl compounds, such as styrene or acrylonitrile, the butadiene being present in the mixture to the extent of from 50% to 99% of the total polymerizable material. The butadiene-styrene copolymer rubbers are manufactured commercially under such names as GR–S, GR–S–10, GR–S–25, and GR–S–50, and the like. The butadiene-acrylonitrile copolymer rubbers are manufactured under such names as "Buna N," "Hycar OR," "Perbunan" and "Chemigum."

The above-described compounds may also be used to a less preferred extent in the vulcanization of Neoprene rubbers. "Neoprene" is a generic name which is applied to polymers of chloroprene and copolymers of chloroprene with dienes or vinyl compounds in which the chloroprene comprises the predominant monomer. These polymers and copolymers are usually made in aqueous emulsions and are avialable on the market under the names as GR–M, Neoprene Type Gn, Neoprene Type E, Neoprene FR, and the like.

Isobutylene rubbers, such as those known in industry as GR–I rubbers, may also be used in the process of the invention.

The rubbers to be vulcanized may be relatively pure products or may be those which have been mixed with plasticizers or extenders, such as various hydrocarbon fractions. Oil-extended GR–S rubbers are particularly preferred materials to be utilized in the process of the invention. The oils used in the preparation of this latter group of rubbers are preferably the aromatic hydrocarbons which are obtained as extracts or residues in processes involving removal of light ends and the various lubricating oil fractions from crude oils. Included among the said products are the various residual asphalts, either per se or in the form of liquid emulsions or solutions with a neutral petroleum oil, as well as the liquid extracts by treating the oil with agents of the type of sulfur dioxide, furfural, phenol, cresol, and the like. These petroleum derivatives vary in viscosity from about 10 cs. at 210° F. up to more or less solid asphaltic compositions softening at about 100 to 200° F., and in specific gravity ($d$ 20/4) from 0.9 to 1.05. The oil used in the preparation of the GR–S rubber stocks shown in the examples at the end of the specification termed Dutrex 20 is an Edeleanu extract of petroleum vacuum distillate fraction from crudes having a specific gravity (20/D) of 1.03, a boiling range of about 182–281° C. at 1 mm. Hg. and a viscosity at 210° F. of about 20 centistokes.

In the operation of the process of the invention, the above-described compounds and sulfur are added to the rubber stock and this mixture is then heated to effect the desired cure or vulcanization. As indicated above, the hydrocarbyl-substituted tetrahydropyrimidines and their carboxylic acid salts may be utilized as the primary vulcanization accelerator or they may be used as activators for known accelerators. As shown in the examples at the end of the specification, the results obtained by using the compounds as activators for accelerators, such as Captax and Santocure, are particularly outstanding, and this is generally the preferred application of the hydrocarbyl-substituted tetrahydropyrimidines and their salts.

Known accelerators that may be used in combination with the hydrocarbyl-substituted tetrahydropyrimidines and their carboxylic acid salts include, among others, 2-mercapto diazodisulfide, dipentamethylene-thiuram-tetrasulfide, tetramethyl thiuram disulfide, tetraethyl thiuram disulfide, mercaptobenzothiazole, paradinitrosobenzene, dipentamethylene-thiuram-tetrasulfide, zinc dibenzyl dithiocarbamate, ferric dimethyl dithiocarbamate, zinc dibutyl dithiocarbamate, selenium diethyl dithiocarbamate, zinc diethyl dithiocarbamate, lead dibutyl dithiocarbamate, zinc N-pentamethylene dithiocarbamate, tetramethyl thiuram monosulfide, tetrabutyl thiuram monosulfide, zinc dimethyldithiocarbamate, lead dimethyldithiocarbamate, cupric dibutyl dithiocarbamate, sodium diethyldithiocarbamate, 2,4-dinitrophenyl dimethyl dithiocarbamate, tetraethyl thiuram disulfide, aluminum dibutyldithiocarbamate, 2-mercapto-4-methylthiazoline, 2-mercapto-5-methylthiazoline, 2-mercapto-4-chloromethyl-thiazoline, 2-mercapto-5-aminothiazoline, 2-mercapto-4-betahydroxyethylthiazoline, bis(oxythiono)polysulfides, 2-mercapto - 4,6 - diaminopyrimidine, 4 - mercapto - 2,6 - diaminopyrimidine, 3-anilinomethyl-2(3)-benzothiazole-thione, dinitrophenyl benzothiazyl sulfide, diphenyl-guanidine acetate, 2-mercaptobenzothiazole, benzothiazyl disulfide, zinc salt of 2-mercaptobenzothiazole, dibutyl xanthogen disulfide, zinc butyl xanthrate, dibenzylamine, N-nitrosodiphenylamine, methylene-para-toluidine, di-ortho-tolylguanidine, diphenylguanidine, triphenylguanidine, N-cyclohexyl-2-benzothiazole sulfenamide.

If the hydrocarbyl-substituted tetrahydropyrimidines and their carboxylic acid salts are used as the primary accelerators, they will be employed in amounts varying from about .1 part to about 5 parts per 100 parts of rubber polymer, and more preferably from about .2 parts to 3 parts per 100 parts of rubber polymer. If the hydrocarbyl-substituted tetrahydropyrimidines and their carboxylic acid salts are used as activators for known vulcanization accelerators, the primary accelerators will generally be employed in amounts varying from about .5 part to 3 parts per 100 parts of rubber polymer, and the hydrocarbyl-substituted tetrahydropyrimidines and their salts may be utilized in amounts varying from about .1 part to 2 parts per 100 parts of polymer. Preferably, the primary accelerator will be employed in amounts varying from about .5 part to 1.5 parts and the activator in amounts varying from about .2 part to 1 part per 100 parts of polymer.

The sulfur employed in effecting the vulcanization may be used either in the form of elemental sulfur or as a sulfur yielding compound. In some instances, such as when pentamethylene thiuram tetrasulfide is used, the one compound may serve simultaneously as an accelerator and as a source of sulfur. The amount of sulfur is not critical and will depend to a large extent upon the type and activity of the accelerator employed with the above-described activators. Certain active types of accelerators will require only relatively small amounts of sulfur, while other less active accelerators will require large amounts of sulfur. In most cases, amounts of sulfur varying from about 0.5 to 3.0 parts per 100 parts of rubber have been found satisfactory.

A great variety of other materials may be included in the composition to be vulcanized. The composition may include, for example, carbon blacks, such as furnace and channel blacks, auxiliary promoters, such as the metal oxides, pigments, softeners, antioxidants, anti-scorch chemicals, vulcanization retarders, and the like.

The compounding of the stock is conveniently accomplished by mixing the components together on an open roll mill. In general practice, the rubber, carbon black, etc., are generally milled together and then the sulfur, accelerator and activator added at the end of the milling process. The compounded product is then placed in appropriate molds and cured at a suitable temperature for an appropriate length of time. Temperatures ranging from about 130° C. to 180° C. are suitable, with the most preferred temperature ranging from about 140° C. to 160° C. The time of cure ranges from about 5 minutes to 180 minutes depending upon the temperature and the curing agent mixture used. With the activators of the present invention, optimum cure time is about 30 minutes.

As indicated above, the vulcanized stock prepared by the above-described process has excellent physical properties, such as good tensile strength and modulus, good elongation and low permanent set and are able to retain these properties even after prolonged overcure or oven aging. The products may be used in the preparation of a great variety of rubber articles, such as automobile tires and tubes, battery casings, hoses, cables, and the like. The excellent solubility characteristics of these pyrimidines and their salts also make them ideal for use in rubber cements and spreader doughs. Brushing cements containing these materials have good resistance to gelling during storage.

To illustrate the manner in which the invention may be carried out, the following examples are given. It is to be understood, however, that the examples are for the purpose of illustration and the invention is not to be regarded as limited to any of the specific conditions cited therein. Parts described in the examples are parts by weight unless otherwise indicated.

All of the rubber stocks disclosed in the examples were compounded on a 6-inch laboratory 2-roll mill. In compounding the accelerator, activator, sulfur and zinc oxide were premixed and added at the end of the mill processing cycle.

Unless otherwise indicated, the mixture containing the accelerator, activator, sulfur, zinc oxide, stearic acid and Agerite powder was made up as follows:

|  | Parts |
|---|---|
| Agerite powder | 1.2 |
| Stearic acid | 2.0 |
| Zinc oxide | 5.0 |
| Sulfur | 1.75 |

Unless otherwise indicated, the GR–S rubber employed in the experiments was an oil-extended GR–S polymer stock containing 100 parts of GR–S polymer (containing about 23.5 parts of styrene and 76.5 parts butadiene and having a viscosity of Mooney of 45–55), 62.5 parts of carbon black and 20 parts of Dutrex 20.

The scorch time reported in the examples was determined by heating the stock to 121° C. and noting time for 15 ml. increase.

The tensile strength, modulus, permanent set were determined by regular ASTM methods.

*Example I*

This example illustrates the use of a tall oil fatty acid salt of 2,2,4,4,6-pentamethyltetrahydropyrimidine as an activator for mercaptobenzothiazole (Captax) and shows the superiority of that combination over mercaptobenzothiazole activated by larger amounts of commercial activators such as the dibutyl amine salt of tall oil fatty acids.

The tall oil salt of 2,2,4,4,6-pentamethyltetrahydropyrimidines used in this experiment was prepared by heating 7.5 parts of 2,2,4,4,6-pentamethyltetrahydropyrimidine with 15 parts of tall oil fatty acids (Ligro) at 60° C. The salt was recovered as a white crystalline solid which was soluble in isopentane and 95% soluble in acetone and had a melting point of 53° C.

1.5 parts of mercaptobenzothiazole and .6 part of the tall oil fatty acid salt described above was mixed with the stearic acid, zinc oxide, sulfur and Agerite powder in the above-noted proportions and this mixture then added to 182.5 parts of GR–S polymer charge described above, which was being milled on the roll mill.

The compounded stock was press-cured at 145° C.

The cure had a very rapid initial rate and reached the optimum cure after about 25 to 30 minutes. The product obtained after 30 minutes was tested for tensile strength, percent elongation, modulus and permanent set. These properties as well as the tendency of composition to scorch are indicated in the table below in comparison to results obtained with similar stocks prepared by using 1.5 parts of mercaptobenzothiazole with 2 parts of dibutyl amine salt of tall oil:

| Test | Activator | |
|---|---|---|
| | Tall Oil Fatty Acid Salt | Dibutyl Amine Salt of Tall Oil |
| Scorch Time, Minutes, at 121° C | 24 | 12 |
| Tensile Strength, p. s. i | 2,790 | 2,715 |
| Elongation, Percent | 400 | 415 |
| Modulus at 300% Elongation, p. s. i | 2,075 | 1,970 |
| Permanent Set, Percent | 6 | 6 |

A comparison of the above demonstrates the improved resistance to scorch and improved properties of the vulcanized product obtained with the tall oil fatty acid salt over the results obtained with the dibutylamine salt of tall oil fatty acids.

The above stocks were then overcured by heating for 90 minutes at 145° C. and the physical properties tested. The results are indicated in the table below:

| Test | Activator | |
|---|---|---|
| | Tall Oil Salt | Dibutyl Ammonium Oleate |
| Tensile Strength, p. s. i | 2,715 | 2,500 |
| Elongation, Percent | 355 | 355 |
| Modulus at 300% Elongation, p. s. i | 2,250 | 2,180 |
| Permanent Set, Percent | 5 | 5 |

A comparison of the above results indicates that the stock cured with the tall oil fatty acid salt has better stability to deterioration by heat than does the one cured with the dibutyl ammonium oleate.

*Example II*

Another experiment was conducted on the order of that shown in the preceding example with the exception that the amount of the primary accelerator, mercaptobenzothiazole, was reduced from 1.5 to 1.0 part and the amount of the tall oil fatty acid salt was increased from .5 to .9 part. In this case, the compounded stock had substantially the same physical properties as those shown in the above example. This establishes another valuable property of the salts of the present invention, namely, their ability to replace more of the expensive primary accelerators and still obtain the same degree of cure.

*Example III*

This example illustrates the use of the tall oil fatty acid salt of 2,2,4,4,6-pentamethyltetrahydropyrimidine (shown in Example I) as an activator for benzothiazyldisulfide (Altax) and shows the superiority of that combination over benzothiazyldisulfide activated by diphenylguanidine.

.3 part of the tall oil fatty acid salt and 1 part of benzothiazyldisulfide were mixed with stearic acid, zinc oxide, sulfur and Agerite powder in the above-noted proportions and this mixture then added to 182.5 parts of polymer charged described above which was being milled on the roll mill.

The compounded stock was then press-cured at 145° C. The cure had a very rapid initial rate and reached the optimum cure after about 25 to 30 minutes. The product obtained after 30 minutes was tested for tensile strength, percent elongation, modulus and permanent set and tendency to scorch. The results are indicated in comparison to a similar stock prepared by using .3 part of diphenylguanidine with 1 part of benzothiazyldisulfide:

| Test | Activator | |
|---|---|---|
| | Tall Oil Salt | Diphenylguanidine |
| Scorch Time, Minutes, at 121° C | 37 | 27 |
| Tensile Strength, p. s. i | 3,080 | 2,870 |
| Elongation, percent | 595 | 415 |
| Modulus at 300% Elongation, p. s. i | 1,380 | 1,900 |
| Permanent Set, percent | 12 | 8 |

A comparison of the above results indicates the improvement in scorch time as well as improvement in physical properties, such as tensile strength and elongation obtained by using the tall oil salt with the Altax.

*Example IV*

This example illustrates the use of the tall oil fatty acid salt of 2,2,4,4,6-pentamethyltetrahydropyrimidine (shown in Example I) as an activator for N-cyclohexyl-2-benzothiazole sulfenamide (Santo-cure) and shows the superiority of that combination over N-cyclohexyl-2-benzothiazole sulfenamide activated by diphenylguanidine.

1.3 parts of the tall oil fatty acid and .75 part of the N-cyclohexyl-2-benzothiazole sulfenamide were mixed with stearic acid, zinc oxide, sulfur and Agerite powder in the above-noted portions and this mixture then added to 182.5 parts of GR–S polymer charge described above which was being milled on the roll mill.

The compounded stock was then press-cured for 30 minutes at 145° C. and tested for tensile strength, percent elongation, modulus and permanent set and tendency to scorch. The results are indicated in the table below in comparison to a similar stock prepared by using .3 part of diphenylguanidine with .75 part of n-cyclohexyl-2-benzothiazole sulfenamide:

| Test | Activator | |
|---|---|---|
| | Tall Oil Salt | Diphenylguanidine |
| Scorch Time, Minutes | 46 | 30 |
| Tensile Strength, p. s. i | 3,405 | 3,200 |
| Elongation, percent | 525 | 465 |
| Modulus at 300% Elongation, p. s. i | 1,790 | 1,900 |
| Permanent Set, percent | 10 | 11 |

Similar results may be obtained by replacing the above-noted tall oil salt with a tall oil fatty acid salt of each of the following: 2,2,4,4,6-pentahexyltetrahydropyrimidine, 2,4-dibutyl-2,4,6-amyltetrahydropyrimidine.

*Example V*

This example illustrates the use of a oleate salt of 2,2,4,4,6-pentamethyltetrahydropyrimidine as an activator for mercaptobenzothiazole.

The oleate salt of 2,2,4,4,6-pentamethyltetrahydropyrimidine was prepared by heating ½ mole of the 2,2,4,4,6-pentamethyltetrahydropyrimidine with ½ mole of oleic acid at 60° C. The resulting salt was a white crystalline solid which was soluble in isopentane and 95% soluble in acetone and had a melting point of 43° C.

1.5 parts of mercaptobenzothiazole and .8 part of the oleate salt was mixed with stearic acid, zinc oxide, sulfur and Agerite powder in the above-noted proportions and this mixture then added to 182.5 parts of GR–S polymer charge described above which was being milled on the roll mill.

The compounded stock was then press-cured for 30 minutes at 180° C. and tested for tensile strength, percent elongation, modulus and permanent set and tendency to scorch. The results are indicated in the table below:

| Test | Activator Oleate Salt |
|---|---|
| Scorch Time, Minutes | 22 |
| Tensile Strength, p. s. i | 3,000 |
| Elongation, percent | 525 |
| Modulus at 300% Elongation, p. s. i | 1,205 |
| Permanent Set, percent | 9 |

*Example VI*

This example illustrates the use of a rosin salt of 2,2,4,4,6-pentamethyltetrahydropyrimidine as a primary accelerator for oil-extended GR–S rubber.

The rosin salt was prepared by mixing 6.4 parts of 2,2,4,4,6-pentamethyltetrahydropyrimidine with 15 parts of polymerized rosin (Poly-Pale Resin). The resulting salt was a crystalline solid which was soluble in isopentane and 95% soluble in acetone and has a melting point of 69° C.

.6 part of the rosin salt prepared above was mixed with stearic acid, zinc oxide, sulfur and Agerite powder in the above-noted proportions and this mixture then added to 182.5 parts of GR–S polymer charge described above which was being milled on the roll mill.

The compounded stock was then press-cured for 30 minutes at 145° C. and tested for tensile strength, percent elongation, modulus and permanent set and tendency to scorch. The results are indicated in the table below:

| Test | Results with the Rosin Salt as Primary Accelerator |
|---|---|
| Scorch Time, Minutes | 24 |
| Tensile Strength, p. s. i | 2,805 |
| Elongation, percent | 465 |
| Modulus at 300% Elongation, p. s. i | 1,720 |
| Permanent Set, percent | 7 |

Similar results may be obtained by replacing the above-noted rosin salt with a rosin salt of each of the following tetrahydropyrimidines: 2,2,4,4,6-pentapropyltetrahydropyrimidine and 2,4-dimethyl-2,4,6-tripropyltetrahydropyrimidine.

*Example VII*

This example illustrates the use of the tall oil fatty acid salt of 2,2,4,4,6 - pentamethyltetrahydropyrimidine as a primary accelerator for oil-extended GR–S rubber.

The tall oil fatty acid salt used in this experiment was prepared by heating 15 parts of 2,2,4,4,6-pentamethyltetrahydropyrimidine with 12.5 parts of tall oil at a temperature of about 60° C. The resulting salt was a white crystalline solid which was soluble in isopentane and 95% soluble in acetone and had a melting point of 44° C.

.6 part of the tall oil salt prepared above was mixed with stearic acid, zinc oxide, sulfur and Agerite powder in the above-noted proportions and this mixture then added to 182.5 parts of the GR–S polymer charge which was being milled on the roll mill.

The compounded stock was then press-cured for 30 minutes at 145° C. and tested for tensile strength, percent elongation, modulus and permanent set and tendency to scorch. The results are indicated in the table below:

| Test | Results with the Tall Oil Salt as Primary Accelerator |
|---|---|
| Scorch Time, Minutes | 27 |
| Tensile Strength, p. s. i | 2,800 |
| Elongation, percent | 485 |
| Modulus at 300% Elongation, p. s. i | 1,045 |
| Permanent Set, percent | 6 |

*Example VIII*

This example illustrates the use of 2,2,4,4,6-pentamethyltetrahydropyrimidine as an accelerator for mercaptobenzothiazole and shows a comparison of that combination with mercaptobenzothiazole activated by diphenylguanidine.

1.5 parts of mercaptobenzothiazole and .3 part of 2,2,4,4,6-pentamethyltetrahydropyrimidine were mixed with stearic acid, zinc oxide, sulfur and Agerite powder in the above-noted proportions and this mixture then added to 182.5 parts of the GR–S polymer charge being milled on the roll mill.

The compounded stock was then press-cured for 30 minutes at 145° C. and tested for tensile strength, percent elongation, modulus and permanent set and tendency to scorch. The results are indicated in the table below in comparison to a similar stock prepared by using .3 part of diphenylguanidine with 1 part of the mercaptobenzothiazole:

| Test | Activator | |
|---|---|---|
| | 2,2,4,4,6-Pentamethyltetrahydropyrimidine | Diphenylguanidine |
| Tensile Strength, p. s. i | 2,800 | 2,600 |
| Modulus at 300% Elongation, p. s. i | 1,750 | 1,500 |
| Elongation, percent | 525 | 435 |
| Permanent Set, percent | 10 | 9 |

The stock activated with 2,2,4,4,6-pentamethyltetrahydropyrimidine was also superior to the diphenylguanidine activated stock in scorch time and showed retention of physical properties on prolonged overcure and oven aging.

*Example IX*

2,2,4,4,6-pentamethyltetrahydropyrimidine was also tested as an accelerator for N-cyclohexyl-2-benzothiazole sulfenamide. In this experiment, 1 part of the N-cyclohexyl-2-benzothiazole sulfenamide and .3 part of the 2,2,4,4,6-pentamethyltetrahydropyrimidine were mixed with stearic acid, zinc oxide, sulfur and Agerite powder in the above-noted portions and this mixture then added to 182.5 parts of GR–S polymer charge as described above which was being milled on the roll mill.

The compounded stock was then press-cured for 40 minutes at 180° C. The stock showed better scorch time, and better retention of physical properties on prolonged overcure and on oven aging than a similar stock cured with diphenylguanidine as the accelerator.

*Example X*

2,2,4,4,6-pentamethyltetrahydropyrimidine was tested as an accelerator for Permalux (di-o-tolylguanidine salt of dicatechol borate) accelerated Neoprene rubber. In this experiment, .5 part of Permalux and 2.0 parts of 2,2,4,4,6-pentamethyltetrahydropyrimidine were mixed with the following:

| | Parts |
|---|---|
| Neozone A | 2 |
| Stearic acid | 0.5 |
| Magnesia (ELC) | 4 |
| Zinc oxide | 5 | and this mixture then added to 1.0 part of Neoprene W and 50 parts of carbon black which were being milled on the roll mill.

The compounded stock was press-cured 15 minutes to 60 minutes at 155° C. The presence of the 2,2,4,4,6-pentamethyltetrahydropyrimidine gave a very rapid cure rate with high tensile strength and low permanent set.

*Example XI*

2,2,4,4,6-pentamethyltetrahydropyrimidine was tested as a primary accelerator for oil-extended GR–S rubber. In this experiment, 1 part of the 2,2,4,4,6-pentamethyltetrahydropyrimidine was mixed with stearic acid, zinc oxide, sulfur and Agerite powder as noted above and this mixture then added to 182.5 parts of the GR–S stock which was being milled on the roll mill.

The compounded stock was press-cured 40 minutes at 145° C. The presence of the 2,2,4,4,6-pentamethyltetrahydropyrimidine gave a satisfactory cure rate and the product possesses satisfactory physical properties.

*Example XII*

2,2,4,4,6-pentamethyltetrahydropyrimidine was tested as an activator for mercaptobenzothiazole in natural rubber stock. In this experiment, 0.75 part of mercaptobenzothiazole and .25 part of 2,2,4,4,6-pentamethyltetrahydropyrimidine was added to 1.0 part of Agerite powder, 1.0 part stearic acid, 5 parts of zinc oxide and 3 parts of sulfur and this mixture then added to 100 parts of natural rubber stock which was being milled on the roll mill.

The compounded stock was then press-cured for 30 minutes at 145° C. The resulting product had tensile strength of 3,275 p. s. i. and an elongation of 68%.

*Example XIII*

Example XII was repeated using a mixture of .75 part of benzothiazyldisulfide and .25 part of 2,2,4,4,6-pentamethyltetrahydropyrimidine as the accelerator-activator combination. The compounded stock in this case cured to form a product having good tensile strength and elongation.

I claim as my invention:

1. In a process for vulcanizing sulfur vulcanizable rubber of the group consisting of natural rubber and rubbery copolymers of butadiene and rubbery polymers of chloroprene, the step which comprises heating at a temperature between 130° C. and 180° C. the rubber with sulfur, a rubber accelerator and an activator consisting of from 0.1 to 5 parts per 100 parts of rubber of a salt of a carboxylic acid of the group consisting of $C_{18}$ fatty acids and rosin acids and a 2,2,4,4,6-pentaalkyl-2,3,4,5-tetrahydropyrimidine which contains no substituted substituent on the tetrahydropyrimidine ring other than the alkyl radicals and wherein each of the 5 alkyl groups contain from 1 to 12 carbon atoms, the salt linkage being formed between the carboxyl group of the carboxylic acid and the nitrogen of the tetrahydropyrimidine.

2. A process for vulcanizing rubber of the group consisting of natural rubber, rubbery polymers of butadiene and rubbery polymers of chloroprene, which comprises heating at a temperature between 130° C. and 180° C. the rubber with sulfur in the presence of a rubber accelerator and an activator consisting of from 0.1 part to 5 parts per 100 parts of rubber of a salt of a carboxylic acid of the group consisting of $C_{18}$ fatty acids and rosin acids and 2,2,4,4,6-pentamethyl-2,3,4,5-tetrahydropyrimidine, wherein the methyl groups are the only substituted substituent on the tetrahydropyrimidine ring, the salt linkage being formed between the carboxyl group of the carboxylic acid and the nitrogen of the tetrahydropyrimidine.

3. A process as in claim 2 wherein the rubber is a butadiene-styrene copolymer.

4. A process as in claim 2 wherein the activator is a tall oil fatty acid salt of 2,2,4,4,6-pentamethyltetrahydropyrimidine.

5. A process as in claim 2 wherein the accelerator is a mercaptobenzothiazole.

6. A process as in claim 2 wherein the activator is an oleic acid salt of 2,2,4,4,6-pentamethyltetrahydropyrimidine.

7. A process as in claim 2 wherein the activator is a salt of 2,2,4,4,6-pentamethyltetrahydropyrimidine and a rosin acid.

8. A composition as in claim 9 wherein the activator is a tall oil fatty acid salt of 2,2,4,4,6-pentamethyltetrahydropyrimidine.

9. In a process for vulcanizing sulfur vulcanizable rubber of the group consisting of natural rubber, rubbery polymers of butadiene and rubbery polymers of chloroprene, the improvement which comprises heating at a temperature between 130° C. and 180° C. the rubber and sulfur in the presence of from .1 to 5 parts per 100 parts of rubber of a compound of the group consisting of (1) 2,2,4,4,6-pentaalkyl-tetrahydropyrimidines which contain no substituted substituent on the tetrahydropyrimidine ring other than the alkyl radicals and wherein each alkyl group contains 1 to 12 carbon atoms, and (2) salts of a carboxylic acid of the group consisting of $C_{18}$ fatty acids and rosin acids, and the aforementioned 2,2,4,4,6-pentaalkyl-tetrahydropyrimidines wherein the salt linkage is formed between the carboxyl group of the acid and the nitrogen of the tetrahydropyrimidine.

10. A vulcanizable composition comprising a rubber of the group consisting of natural rubber, rubbery polymers of butadiene and rubbery polymers of chloroprene, sulfur and from .1 to 5 parts per 100 parts of rubber of a compound of the group consisting of (1) 2,2,4,4,6-pentaalkyl-tetrahydropyrimidines which contain no substituted substituent on the tetrahydropyrimidine ring other than the alkyl radicals and wherein each alkyl group contains 1 to 12 carbon atoms, and (2) salts of a carboxylic acid of the group consisting of $C_{18}$ fatty acids and rosin acids, and the aforementioned 2,2,4,4,6-pentaalkyl-tetrahydropyrimidines wherein the salt linkage is formed between the carboxyl group of the acid and the nitrogen of the tetrahydropyrimidine.

References Cited in the file of this patent

UNITED STATES PATENTS

| | | |
|---|---|---|
| 1,885,509 | Byers | Nov. 1, 1932 |
| 2,126,269 | Messer | Aug. 9, 1938 |
| 2,234,848 | Horst | Mar. 11, 1941 |
| 2,516,626 | Haury | July 25, 1950 |
| 2,658,895 | Ballard et al. | Nov. 10, 1953 |

OTHER REFERENCES

Chem. Abs., page 1287(h), 1948.